United States Patent [19]
Fayerman et al.

[11] Patent Number: 5,733,129
[45] Date of Patent: Mar. 31, 1998

[54] STUTTERING TREATMENT TECHNIQUE

[76] Inventors: Izrail Fayerman, 64-34 99th St., Apartment 6B, Rego Park, N.Y. 11374; Michael Fayerman, 76-01 113th St., Apartment 7D, Forest Hills, N.Y. 11375

[21] Appl. No.: 789,278

[22] Filed: Jan. 28, 1997

[51] Int. Cl.[6] .................................................. G09B 19/04
[52] U.S. Cl. ........................................................ 434/185
[58] Field of Search ..................................... 434/185, 156

[56] References Cited

U.S. PATENT DOCUMENTS 3,667,138  6/1972  Cohen ....................................... 434/185
4,460,342  7/1984  Mills ......................................... 434/185

FOREIGN PATENT DOCUMENTS 2190  7/1869  United Kingdom ................... 434/185

Primary Examiner—Jeffrey A. Smith
Attorney, Agent, or Firm—Gottlieb, Rackman & Reisman

[57] ABSTRACT

An improved method and apparatus for training stuttering students to speak fluently is described. The student practices various speech exercises as part of a detailed plan which lasts several weeks and which gradually trains the student to speak more and more complex word patterns with an aim of retraining the stutterer to speak fluently.

23 Claims, 1 Drawing Sheet

STUTTERING TREATMENT TECHNIQUE

TECHNICAL FIELD

This invention relates to stuttering techniques, and more particularly, to an improved method and apparatus for retraining patients who are suffering from stuttering problems to speak fluently.

BACKGROUND OF THE INVENTION

Stuttering is a common problem present in many individuals. It is estimated that five million people in the United States alone suffer from some form of stuttering problem. Stuttering is caused by a problem in transmitting speech signals from the brain to the mouth, diaphragm, and other muscles which control speech.

There are many prior art techniques which have been utilized in an attempt to retrain patients suffering from stuttering problems to speak more fluently. In one form or another, all of these prior art techniques involve using a metronome during periodic visits to a speech therapist.

Typically, a mechanical or electronic metronome is activated. The patient is then instructed to speak or to read a poem, book, or other text, and to pace himself or herself using the beat of the metronome. The pace of the metronome may be adjusted in accordance with the patient's progress. Additionally, as the patient becomes more advanced, longer and more complicated texts may be read.

One example of a prior art system is described in U.S. Pat. No. 4,012,852 issued to Journot et al. on Mar. 22, 1977. The Journot arrangement includes an electronic teaching apparatus in which the speech rate and volume may be adjusted. The device described also keeps track of a patient's responses and progress.

While prior art arrangements such as that taught by Journot have proved to be somewhat useful in speech therapy, they all lack any specific treatment plan. The prior art approach has been to provide the speech therapist and/or patient with an electronic metronome in one form or another, and then simply to allow for experimentation in order to determine how to improve a patient's speech.

The nature of the prior art requires that weeks or months of experimentation be done until the therapist fortuitously stumbles upon a treatment plan that happens to improve the patient's speech. In view of this drawback, it would be desirable to construct a standard treatment plan which can be utilized by patients in their homes, with minimal training, in order to retrain themselves to speak fluently and overcome their stuttering problems.

SUMMARY OF THE INVENTION

The above and other problems of the prior art are overcome and a technical advance is achieved in accordance with the present invention which relates to a method for improving the speech fluency of those afflicted with stuttering problems. In accordance with the present invention, the treatment plan is divided into several treatment periods ("phases"), each typically enduring for several weeks.

During each phase, the patient follows commands from an electronic timer and learns to inhale rhythmically, then to speak several times at pre-determined intervals, and then to exhale. After the first phase, this is done in accordance with a speech formula, defined hereinafter.

During the first phase, breathing exercises and speaking exercises with vowels and syllables are practiced. In response to signals from an electronic timer, the patient repeats vowels or syllables in a specified pattern. Preferably, the patient does this daily for two weeks. During a second phase, two weeks are spent on word exercises in which the words are spoken at a fixed rate. During a third phase, the same word exercises are utilized, but the words are spoken at a variable rate. During a fourth phase, review exercises are performed.

The duration of each of the phases (except the last) is preferably approximately two weeks. During each phase, exercises from previous phases are also incorporated therein. The exercises during each phase are performed in response to signals which may include tones and/or silent vibrations and/or voice commands.

In an optional embodiment, as the patient progresses he or she may be instructed to say two or more words, rather than just one word, in between tones, vibrations or commands. This further improves fluency and confidence.

DETAILED DESCRIPTION THE PREFERRED EMBODIMENTS

Figure 1:
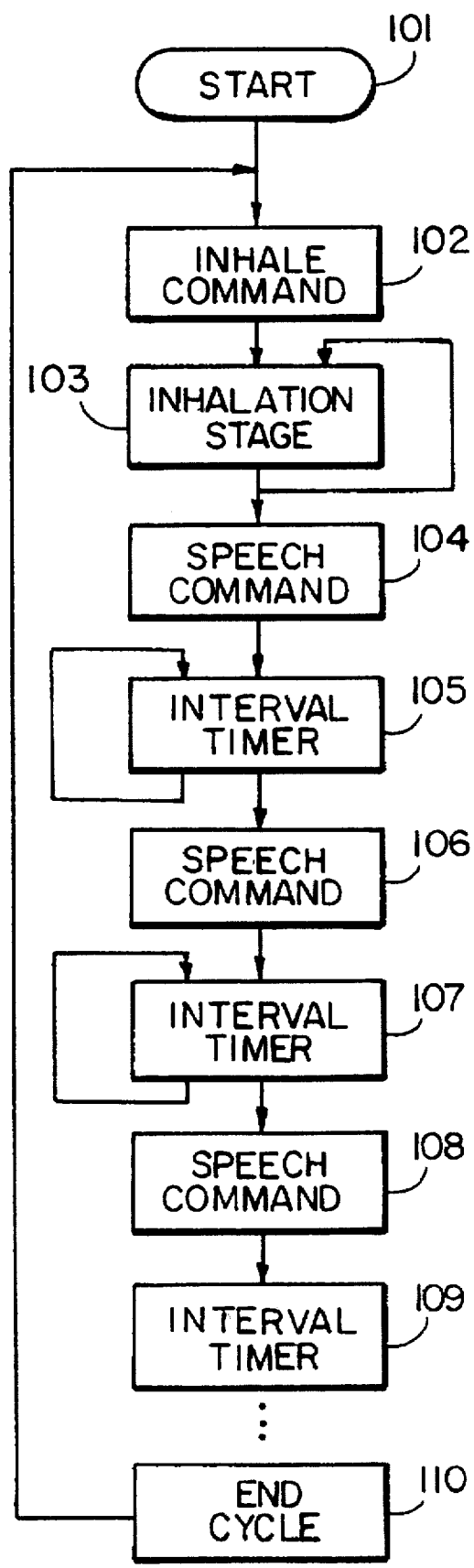
FIG. 1 shows a flowchart depicting the basic steps of an exemplary speech formula in accordance with the present invention.

FIG. 1 depicts a flowchart representing an exemplary speech formula to be used in a preferred embodiment of the invention. The flowchart of FIG. 1 is depicting a general exercise sequence intended to be used in conjunction with a "speech box," a device which can issue tones at predetermined intervals. Such devices may be easily designed according to the intervals desired, and many are available presently, although not with the intervals needed for the present technique. Nevertheless, the available speech boxes may be modified quite easily to generate the required intervals discussed below. Additionally, the tones may be replaced with voice commands (such as "speak") or with silent vibrations. The actual commands issued by the speech box and the responses of the patient, as well as the intervals between each response of the patient, may also be varied depending upon the degree of treatment required by each patient.

The flowchart is entered via start 101. An inhale command is issued at block 102 and the patient is given a reasonable time, represented by inhalation stage 103, in which to inhale using abdominal breathing and to ready himself or herself for further commands.

A speech command is issued at block 104. Simultaneously with the issuance of this command, an interval timer 105 begins operation. Interval timer 105 counts off a time interval in the range of from about 1.5 seconds to about 3.0 seconds. An exemplary value which has been found to be extremely satisfactory for operation of interval timer 105 is about 2.8 seconds.

While interval timer 105 is operating, the patient responds to the speech command issued at block 104. This command may simply be a tone or vibration or voice command from the speech box, in response to which the patient says a particular word.

After interval timer 105 has terminated operation, the next command block 106 is entered and another speech command is issued. The patient then has an additional time interval in the range of from about 1.5 seconds to about 3.0 seconds (and preferably about 2.8 seconds), measured by another interval timer 107, in which to respond to the new command issued at block 106.

As shown in FIG. 1, the process continues with a third speech command issued at block 108 and yet another interval timer 109 which also counts off a time interval in the range of from about 1.5 seconds to about 3.0 seconds (again preferably about 2.8 seconds) during which the patient must respond yet again. Although the alternation of command issuance and interval timing can be repeated several more times thereafter, it has been found most ideal to restrict the sequence to an inhale command followed by three speech commands and then an end cycle 110, which causes the system to return to the beginning and issue another inhale command. This basic building block of inhaling, dividing a spoken phrase into three segments and exhaling, is denoted herein as the speech formula. The speech formula is utilized over a several-week period commencing with the second phase of the treatment plan. Each time the speech formula is used, the patient is preferably encouraged to keep track of the individual intervals in each cycle by counting them silently using his or her fingers, or alternatively, the speech box can be equipped to generate silent vibrations in response to patient input to enable the patient to delineate the individual intervals to himself or herself.

During the second phase of the treatment plan, word exercises are practiced in which the words are spoken at a fixed rate, and which the patient performs in response to predetermined tones, vibrations and/or commands in accordance with the speech formula as previously set forth herein. These word exercises are performed several times per day and they include both memorized automatic speech (such as repeating children's poems and prayers, counting numerals or stating letters of the alphabet) and unmemorized speech (defined hereinafter). However, during the second phase vowel exercises and syllable exercises (initially performed during the first phase) are also practiced periodically. Therefore, by the end of four weeks when the second phase is complete, the patient is completely familiar with everything from the first and second phases and due to the integration thereof does not forget what he or she learned during the first phase.

During the third phase, there are also periodic exercises including some from the first phase. However, also added are word exercises in which the words are spoken at a variable rate, and which the patient also performs in response to predetermined tones, vibrations and/or commands in accordance with the speech formula as previously set forth herein.

Finally, the fourth phase comprises everyday speech practiced first with and later without the assistance of a speech box (but preferably still according to the pattern of the speech formula), combined with review exercises. Thus, as the patient becomes more advanced, all of the techniques from prior phases are reinforced.

The basic speech formula described above is utilized in the different phases over a several week period to correct the stuttering problem. Each of the phases is described in further detail below.

During phase one, the first two days are spent doing deep breathing exercises in twelve five-minute sessions that are spaced throughout each day (six sessions for patients under eight years of age). The exercises during this portion of the program comprise inhaling through the nose as much as possible and then exhaling slowly through the mouth using the lips as a tube. During inhaling the abdomen is expanded, while during exhaling the volume of the abdomen is decreased. Importantly, the patient is instructed not to move the chest and shoulders.

During the next two days, the length of each session is increased to fifteen minutes, five minutes of which are spent dong the deep breathing exercises, and ten minutes of which are spent doing vowel exercises while utilizing a speech box as an electronic metronome. The first vowel exercise comprises the following: after inhaling, one vowel sound is stated but held for six seconds, like a singer holding a note, followed by exhaling. Thereafter, a second vowel exercise, wherein two different vowel sounds are stated for three seconds each (after inhaling), is performed. Then, three different vowel sounds are stated for two seconds each, and finally, six different vowel sounds are stated for one second each, i.e., one vowel per second. These fifteen-minute sessions are repeated eight times per day (six times per day for patients under eight years of age).

Next, but still during the first week of phase one, syllable exercises are added, but the length of each session remains constant at fifteen minutes, with the first five minutes devoted to the deep breathing exercises, followed by five minutes of the vowel exercises and then five minutes of syllable exercises. For the next three days (i.e., days five through seven), these fifteen-minute sessions are repeated eight times per day (six times per day for patients under eight years of age), but the syllable exercises are limited to single-syllable exercises only, and the single-syllables which are most difficult for the patient are omitted. As used herein, a single-syllable consists of a consonant sound followed by a vowel sound, and the single-syllable exercises comprise the following: first, two single-syllables are stated for three seconds each, then three single-syllables are stated for two seconds each, and finally six single-syllables are stated for one second each. During the single-syllable exercises, a speech box is once again used as a metronome. These sessions are utilized until the end of the first week of phase one.

The second week of phase one is divided into two portions, and a speech box is utilized throughout both portions. During the first portion, which consists of three days (i.e., days eight through ten), the same regimen is followed as in days five through seven, except that now the syllables which are most difficult for the patient are included in the single-syllable exercises. In addition, however, a deep breathing milestone test is administered once each day, the results of which will determine the nature of the exercises to be performed during the second portion of the second week of phase one (i.e., during days eleven through fourteen). The deep breathing milestone test consists of observing the patient while he or she is talking and while he or she is sleeping, to insure that the patient's abdomen moves up and down (or in and out) with each breath, i.e., that the abdomen moves up (or out) each time the patient inhales, and moves down (or in) each time the patient exhales.

If the patient fails the deep breathing milestone test on any day of the three consecutive days (days eight through ten) on which it is administered, then during the second portion of the second week of phase one (i.e., during days eleven through fourteen), the same regimen is followed as on days eight through ten, including the deep breathing milestone test.

As soon as the patient passes the deep breathing milestone test on three consecutive days, the deep breathing exercises are no longer included as a regular feature of each session, but the length of each session remains constant at fifteen minutes, with the first five minutes now devoted to the vowel exercises, followed by an increased amount, i.e., ten minutes of the syllable exercises. However,. although the number of sessions per day remains the same as in the first portion of the second week of phase one, during this second portion (i.e., during days eleven through fourteen) the syllable exercises are no longer limited to single-syllable exercises; instead, multi-syllable exercises are included. As used herein, a multi-syllable consists of a vowel followed immediately by a single-syllable. The multi-syllable exercises comprise he following: first, two multi-syllables are stated for three seconds each, then three multi-syllables are stated for two seconds each, and finally six multi-syllables are stated for one second each. During the four days comprising the second portion of the second week of phase one, the ratio of multi-syllable exercises to single-syllable exercises is gradually increased.

The foregoing completes phase one of the exemplary program, which is intended to be two weeks in length. Next the patient enters phase two, which is also intended to last for two weeks. During the first week of phase two, word exercises (also referred to as "speaking in intervals") are added. The word exercises initially comprise counting or other forms of controlled, memorized speech, although later they also comprise various forms of unmemorized speech (e.g., oral reading practice and spontaneous speech).

Although the length of each session still remains constant at fifteen minutes, during the first four days of the first week of phase two (i.e., during days fifteen through eighteen) the first seven minutes of each session are devoted to the syllable exercises (both single-syllable and multi-syllable exercises), while the last eight minutes comprise word exercises, but the word exercises are limited to memorized speech only, with the words stated at the rate of one word per interval in accordance with the speech formula (as in phase one, a speech box is preferably used throughout phase two as well). The specific words spoken by the patient are unimportant, so long as they can be spoken in sequence from memory. Examples of memorized speech include counting or reciting the days of the week, the months of the year, poems, nursery rhymes, familiar song lyrics, prayers, etc. (for patients under the age of seven, passages memorized from story books that are simple and repetitive can also be used). During days fifteen through eighteen, these fifteen-minute sessions are repeated twelve times per day (six times per day for patients under eight years of age).

During the remainder of the first week of phase two (i.e., during days nineteen through twenty-one), the length of each session again remains constant at fifteen minutes, with the first three minutes devoted to the syllable exercises (performed as a "warm-up"), followed by six minutes of word exercises utilizing memorized speech with the words stated at one word per interval in accordance with the speech formula (as above), and then six minutes of word exercises utilizing unmemorized speech with the words stated at the same rate, also in accordance with the speech formula (for patients over seven years of age, the latter six minutes of word exercises can also include oral reading, although only marked reading passages (defined hereinafter) should be read, with the words marked in one-word segments and stated at one word per interval). During days nineteen through twenty-one, these fifteen-minute sessions are repeated eight times per day (six times per day for patients under eight years of age), using the speech formula.

As used herein, unmemorized speech may include picture descriptions and/or questions and answers, although for patients under ten years of age, unmemorized speech may also include pretend play. As used in the preceding sentence, (1) picture descriptions include showing the patient photographs or pictures that are appropriate for the patient's age, in order to stimulate conversation in which the patient is encouraged to speak in complete sentences (preferably, prompting questions such as "What is happening in this picture?" or "Does this picture relate to you and your life?" are used); (2) questions and answers means asking the patient age-appropriate questions, especially those that focus on topics of particular interest to the patient, as a different means of stimulating conversation; and (3) pretend play signifies enabling the patient to engage in the type fantasy play involving toys (e.g., cars, trains, action figures, dolls, dollhouses, etc.) in which children enjoy talking as they play. As used herein, a marked reading passage is a reading passage that has been marked with slashes so as to subdivide it into sections or segments consisting of one, two, three or a variable number of words, and that has also been marked with the words "inhale" and "exhale" to denote the segments that are to be spoken within the same breath.

Beginning with the second week of phase two, although the length of each session and the number of sessions per day remains the same, during the first three days of that week (i.e., during days twenty-two through twenty-four), each session consists of three minutes of warm-up syllable exercises, followed by six minutes of word exercises consisting of memorized speech in which the words are stated at two words per interval in accordance with the speech formula, and then six minutes of word exercises consisting of unmemorized speech in which the words are stated at the same rate, also in accordance with the speech formula (for patients over seven years of age, the latter six minutes may also include oral reading, but again only from marked reading passages, although with the words marked in two-word segments and stated at two words per interval). For the remaining four days of the second week of phase two (i.e., during days twenty-five through twenty-eight), the same regimen is followed as in days twenty-two through twenty-four, except that now the word exercises are performed more quickly, i.e., the words are stated at the rate of three words per interval in accordance with the speech formula, and in the case of marked reading passages, the passages are marked in three-word segments.

The foregoing concludes phase two of the exemplary program, although it is to be understood that throughout the first and second weeks of phase two, the complexity of the memorized speech is gradually increased, and that on any one day (which may be chosen at random) during each of these two weeks, the deep breathing exercises utilized during phase one are practiced, preferably by adding three minutes of the deep breathing exercises to each session on that day.

During phase three, which is also intended to last two weeks, the syllable exercises utilized during phases one and two are eliminated as a regular feature of each session, although on any one day (which may be chosen at random) in each of the two weeks of phase three, the warm-up syllable exercises are practiced, preferably by adding three minutes of such syllable exercises to each session on that day. The deep breathing exercises are similarly practiced during phase three in the same manner, although preferably the deep breathing exercises are not practiced on the same day in each week of phase three as the day on which the syllable exercises are practiced.

During the first week of phase three (i.e., during days twenty-nine through thirty-five) the length of each session, and the number of sessions per day, remains the same. However, each session now consists of six minutes of word exercises using memorized speech in which the words are stated at a variable rate in accordance with the speech formula, followed by nine minutes of word exercises utilizing unmemorized speech in which the words are also stated at a variable rate, also in accordance with the speech formula. As in phase two, for patients over seven years of age the latter nine minutes of word exercises may also include oral reading, but in phase three the oral reading begins with marked reading passages (marked in variable-word segments) and then progresses to unmarked reading passages during the course of phase three. The word exercises utilized during phase three (and beyond) require the patient to state the words at a variable rate, i.e., to state one, two, three or four words per interval, either at random or at the patient's option (based upon the meaning of the words spoken), unless the patient is reading aloud from a marked reading passage.

During the second week of phase three (i.e., during days thirty-six through forty-two), the length of each session and the number of sessions per day remain the same, but word exercises utilizing memorized speech are no longer included as a regular feature of each session. Instead, the entire session is devoted to word exercises using unmemorized speech (and also including, for patients over the age of seven, oral reading, although now only unmarked reading passages should be read), with the words again stated at a variable rate consisting of no less than one word and no more than four words per interval, at the patient's option (the number of words spoken per interval may be changed randomly, and the manner in which this number changes is not critical). Throughout the second week of phase three, the speech formula discussed hereinabove is again utilized.

The final phase of the exemplary program (phase four) begins with the seventh week (i.e., on day forty-three) and continues for at least two months and perhaps indefinitely thereafter. During phase four, the patient begins to utilize the principles of the speech formula in the course of everyday speech (first with, and then gradually without, the assistance of a speech box), but at the same time continues to practice with review exercises performed in two fifteen-minute sessions each day. For the first two months of phase four, each review exercise session consists of four minutes devoted to the vowel exercises utilized during earlier phases, followed by four minutes of the syllable exercises utilized during earlier phases, and then seven minutes of word exercises, utilizing unmemorized speech spoken at a variable rate (for patients over seven years of age, the latter may also include oral reading, but again only from unmarked reading passages). After the first two months of phase four, the same review exercises are still performed in two fifteen-minute sessions per day, but now only on one day per week.

It is understood that while the above describes the preferred embodiment of the invention, various other modifications and or additions may be made without violating the spirit and scope thereof. Such variations and/or modifications are intended to be covered by claims appended hereto.

We claim:

1. A method of retraining a stuttering patient to speak fluently comprising the steps of
    performing breathing, vowel, and syllable exercises during a first phase of said retraining;
    performing a first set of word exercises during a second phase of said retraining, said second phase also including said breathing and syllable exercises from said first phase of said retraining, said first set of word exercises comprising stating words at a fixed rate; and
    performing a second set of word exercises during a third phase of said retraining, said third phase also including said breathing and syllable exercises from said first phase of said retraining, said second set of word exercises comprising stating words at a variable rate.

2. The method of claim 1 further comprising a fourth phase, said fourth phase including said second set of word exercises from said third phase, and said vowel and syllable exercises from said first phase.

3. The method of claim 2 wherein each of said first, second and third phases comprises substantially two weeks.

4. The method of claim 3 wherein said first set of word exercises and said second set of word exercises are performed in accordance with a speech formula comprising the steps of allowing said patient to inhale, followed by the issuance of a plurality speech commands, each said speech command being followed immediately and being separated from the next speech command by a first interval of pre-determined duration during which said patient is allowed to respond to the preceding speech command by stating at least one word.

5. The method of claim 4 wherein said plurality of speech commands comprise three speech commands, and wherein said first interval is in the range of from about 1.5 seconds to about 3.0 seconds.

6. The method of claim 5 wherein said first interval is about 2.8 seconds.

7. The method of claim 4 wherein said first set of word exercises and said second set of word exercises are performed in response to a speech box, said speech box being configured to emit signals corresponding to said speech commands.

8. The method of claim 7 wherein said signals are chosen from the group consisting of audible tones, voice commands and silent vibrations.

9. The method of claim 8 wherein said vowel exercises and said syllable exercises are performed by allowing a second interval of pre-determined duration during which said patient respectively states at least one vowel or at least one syllable.

10. The method of claim 9 wherein the duration of said second interval is chosen from the group consisting of one second, two seconds, three seconds and six seconds.

11. The method of claim 10 wherein said breathing exercises include the steps of inhaling through the nose to expand the abdomen, and exhaling through the mouth to contract the abdomen, while moving the chest and shoulders as little as possible during each said step.

12. A method of performing vowel exercises comprising the steps of
    inhaling;
    stating a vowel for a first period of time;
    exhaling;
    inhaling;
    stating two vowels for a second period of time;
    exhaling;
    inhaling;
    stating three vowels for a third period of time;
    exhaling;
    inhaling;
    stating six vowels for a fourth period of time; and
    exhaling.

13. The method of claim 12 wherein said first, second, third and fourth periods of time are respectively six seconds, three seconds, two seconds and one second in length.

14. A method of performing syllable exercises comprising the steps of inhaling;

stating two single-syllables for a first period of time;

exhaling;

inhaling;

stating three single-syllables for a second period of time;

exhaling;

inhaling;

stating six single-syllables for a third period of time; and exhaling.

15. The method of claim 14 comprising the additional steps of inhaling;

stating two multi-syllables for said first period of time;

exhaling;

inhaling;

stating three multi-syllables for said second period of time;

exhaling;

inhaling;

stating six multi-syllables for said third period of time; and exhaling.

16. The method of claim 15 wherein said first, second and third periods of time are respectively three seconds, two seconds and one second in length.

17. The method of claims 13 or 16 wherein a speech box is arranged to emit signals, in response to which said exercises are performed.

18. The method of claim 17 wherein said signals are chosen from the group consisting of audible tones, voice commands and silent vibrations.

19. A method of performing word exercises comprising the steps of (a) inhaling, (b) issuing a plurality of speech commands, each said speech command being followed immediately and being separated from the next speech command by an interval of pre-determined duration, and (c) responding to the preceding speech command by stating at least one word during said interval.

20. The method of claim 19 wherein said plurality of speech commands comprises three speech commands, and wherein said interval is in the range of from about 1.5 seconds to about 3.0 seconds.

21. The method of claim 20 wherein said interval is about 2.8 seconds.

22. The method of claim 21 wherein said exercises are performed in response to a speech box, said speech box being configured to emit signals corresponding to said speech commands.

23. The method of claim 22 wherein said signals are chosen from the group consisting of audible tones, voice commands and silent vibrations.

* * * * *